US00RE39630E

(19) United States
(12) Reissued Patent
Stangeland et al.

(10) Patent Number: US RE39,630 E
(45) Date of Reissued Patent: May 15, 2007

(54) TURBINE BLISK RIM FRICTION FINGER DAMPER

(75) Inventors: Maynard L. Stangeland, Thousand Oaks, CA (US); Roger Eric Berenson, Moorpark, CA (US); Gary Alan Davis, Camarillo, CA (US); Eric J. Krieg, Simi Valley, CA (US)

(73) Assignee: United Technologies Corporation, Hartford, CT (US)

(21) Appl. No.: 10/937,867

(22) Filed: Sep. 9, 2004

Related U.S. Patent Documents

Reissue of:
(64) Patent No.: 6,375,428
Issued: Apr. 23, 2002
Appl. No.: 09/636,536
Filed: Aug. 10, 2000

(51) Int. Cl.
*F01D 25/04* (2006.01)

(52) U.S. Cl. ..... 416/190; 416/193 A; 416/500; 74/574

(58) Field of Classification Search ..... 415/119, 415/190; 416/193 A, 234, 500; 74/574
See application file for complete search history.

(56) References Cited

U.S. PATENT DOCUMENTS 1,434,414 A * 11/1922 Stoney ..... 416/244 R
2,836,392 A * 5/1958 Spaeth ..... 416/215
2,948,505 A * 8/1960 Sonder ..... 416/96 R
3,356,339 A * 12/1967 Thomas et al. ..... 416/244 R
3,677,662 A * 7/1972 Cronstedt ..... 416/183
4,171,930 A * 10/1979 Brisken et al. ..... 416/220 R
4,361,213 A * 11/1982 Landis et al. ..... 188/378
4,817,455 A * 4/1989 Buxe ..... 416/144
4,848,182 A * 7/1989 Novotny ..... 464/180
4,859,143 A * 8/1989 Larrabee et al. ..... 415/142
5,373,922 A * 12/1994 Marra ..... 188/379
5,518,639 A 5/1996 Lawrence et al.
5,582,077 A * 12/1996 Agram et al. ..... 464/180
5,733,103 A * 3/1998 Wallace et al. ..... 416/248
5,827,047 A * 10/1998 Gonsor et al. ..... 416/193 A

FOREIGN PATENT DOCUMENTS

EP 0 186 638 A 7/1986
GB 168 997 A 9/1921
GB 2 255 138 A 10/1992

* cited by examiner

*Primary Examiner*—Ninh H. Nguyen
(74) *Attorney, Agent, or Firm*—Harness, Dickey & Pierce, P.L.C.

(57) ABSTRACT

A damper for reducing vibrations in an integrally bladed turbine disk is provided. The damper includes an annular member and a plurality of fingers. The annular member is configured so that it is coupled to a face of the integrally bladed turbine disk. The plurality of fingers are circumferentially spaced around the annular member. Each of the fingers includes a base portion which is coupled to the annular member and extends radially therefrom. Each of the fingers is tangentially movable relative to the annular member when the turbine disk vibrates in a diametral mode shape such that the plurality of fingers contacts a surface of the turbine disk to absorb vibrations.

16 Claims, 7 Drawing Sheets

TURBINE BLISK RIM FRICTION FINGER DAMPER

Matter enclosed in heavy brackets [ ] appears in the original patent but forms no part of this reissue specification; matter printed in italics indicates the additions made by reissue.

TECHNICAL FIELD

The present invention relates generally to turbines and more particularly to a damper for dampening vibration in a turbine disk.

BACKGROUND OF THE INVENTION

Discussion

Turbine disks are commonly subject to high cycle fatigue failure due to resonant vibration and fluid-structure instabilities. Disks have several critical speeds wherein operation of the disk at any one of these speeds creates an amplified traveling wave within the disk, inducing potentially excessive dynamic stresses. At each of these critical speeds the wave is fixed with respect to the housing and can be excited by any asymmetries in the flow field. The resulting resonant vibration prevents the operation of conventional turbine disks at critical speeds. Fluid-structure instabilities arise due to coupling between the surrounding fluid and the disk, which can also induce excessive stresses and prevent operation at speeds above a threshold stability boundary.

In conventional turbine disks with separate blades assembled onto a disk, blade damping techniques are typically employed to reduce resonant response as well as to prevent the fluid-structure instability that results from the coupling of aerodynamic forces and structural deflections. Accordingly, it is common practice to control blade vibration in the gas turbine and rocket engine industry by placing dampers between the platforms or shrouds of individual blades attached to the disk with a dovetail or fir tree. Such blade dampers are designed to control vibration through an energy dissipating friction force during relative motion of adjacent blades in tangential, axial or torsional vibration modes. Blade dampers, in addition to the blade attachments, provide friction dampening for both disk and blade vibration.

This damping mechanism, however, is not feasible for integrally bladed turbine disks (blisks) unless radial slots are machined between each blade to introduce blade shank flexibility. The added complexity of the slots increases the rim load on the turbine disk and defeats some of the cost, speed and weight benefits of the blisk. Consequently, the lack of a blade attachment interface results in a significant reduction in damping and can result in fluid-structure instability at speeds other than the disk standing wave critical speeds.

Rim dampers have been utilized by the gear industry to reduce vibration in thinly webbed large diameter gears. In such applications a split ring or series of spiral rings are preloaded in one or more retainer grooves on the underside of the gear rim. At relatively low rim speeds the centrifugal force on the damper ring provides damping due to relative motion when the gear rim experiences vibration in a diametral mode. This method of friction damping, however, is not feasible at high rim speeds because the centrifugal force on the damper ring is of sufficient magnitude to cause the damper to lock-up against the rim. Lock-up occurs when the frictional forces become large enough to restrain relative motion at the interface, causing the damper ring to flex as an integral part of the rim.

SUMMARY OF THE INVENTION

It is one object of the present invention to provide a damper for an integrally bladed turbine disk which employs a plurality of fingers to reduce the vibration of an integrally bladed turbine disk. The damper is primarily intended to reduce vibration when the integrally bladed turbine disk vibrates in a diametral mode shape. However, the damper is also effective in reducing the vibration of turbine blades mounted on the disk rim.

It is another object of the present invention to provide a damper having a profile which applies a frictional contact force continuously over a disk profile to direct the contact force normal to the disk surface.

In one preferred form, the present invention provides a damper for reducing vibrations in an integrally bladed turbine disk. The damper includes an annular member and a plurality of fingers. The annular member is configured so that it is retained by a radial step on the inside face of the integrally bladed turbine disk rim. Alternatively, conventional fasteners may be employed to couple the annular member to the integrally bladed turbine disk rim. The plurality of fingers are coupled to and concentrically spaced around the annular member. Each of the fingers is adapted to provide relative circumferential motion with respect to the inside face of the integrally bladed turbine disk when the integrally bladed turbine disk vibrates in a diametral mode shape. The annular member is configured to provide structural support to the fingers so that they apply a contact force to the integrally bladed turbine disk that is directed normal the disk surface.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
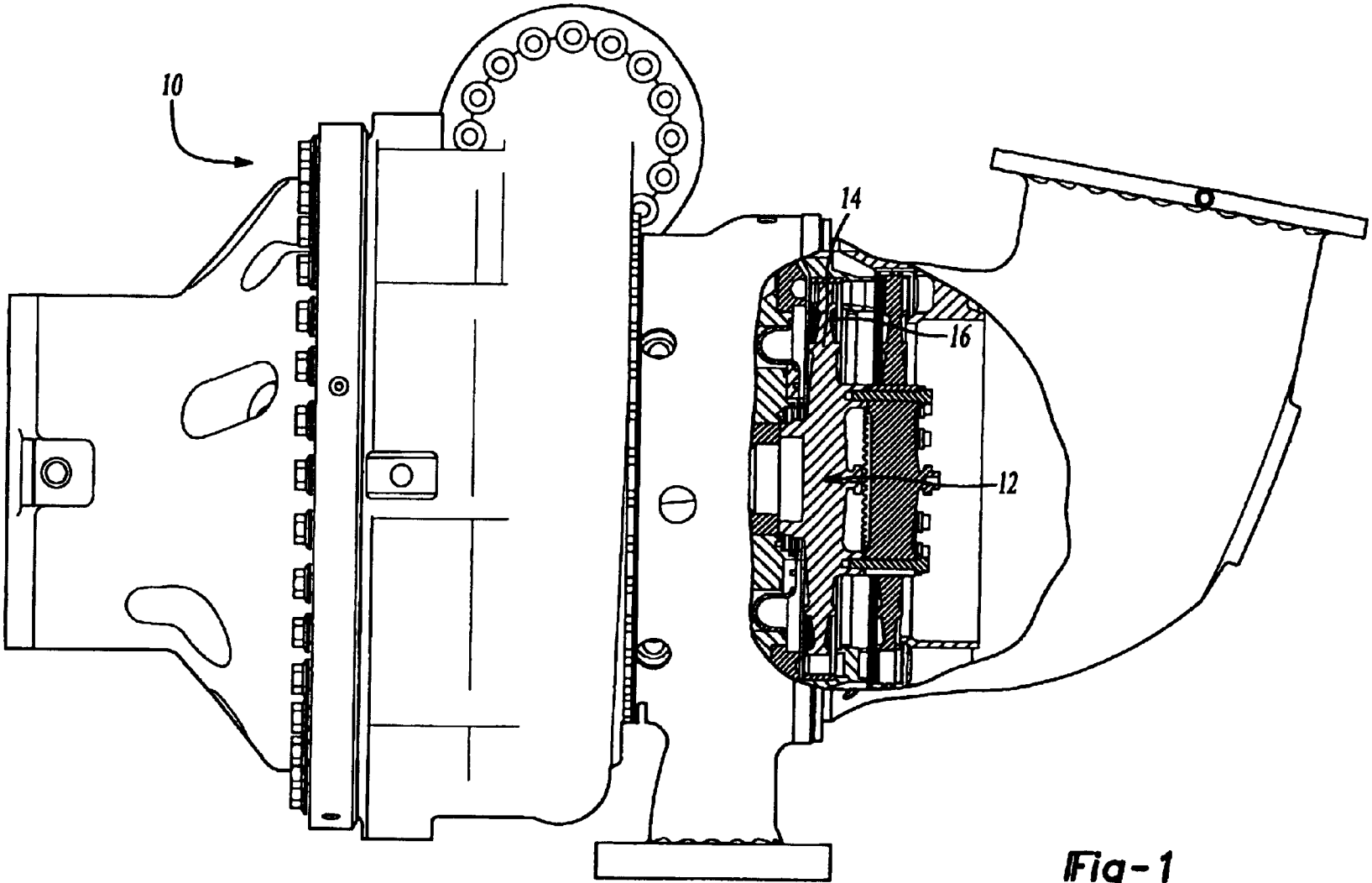
FIG. 1 is a cross-sectional view of an integrally bladed turbine disk assembly constructed in accordance with the teachings of the present invention.

With reference to FIG. 1 of the drawings, a turbopump 10 wherein various embodiments of the present invention may be effectively utilized is shown in a cross-sectional view. The turbopump 10 is shown to include an integrally bladed turbine disk assembly 12 having an integrally bladed turbine disk 14 and a damper 16.

Figure 2:
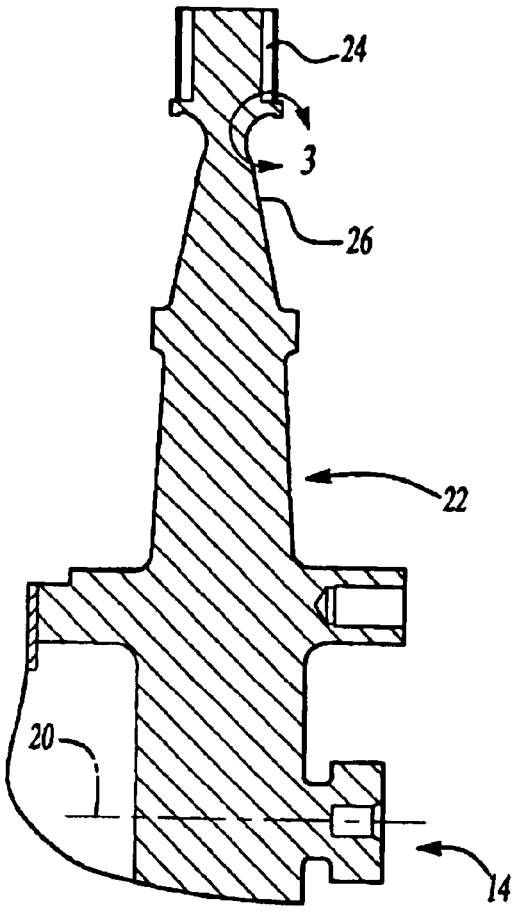
FIG. 2 is a longitudinal cross-sectional view of a portion of the integrally bladed turbine disk assembly of FIG. 1 illustrating the integrally bladed turbine disk.
Figure 3:
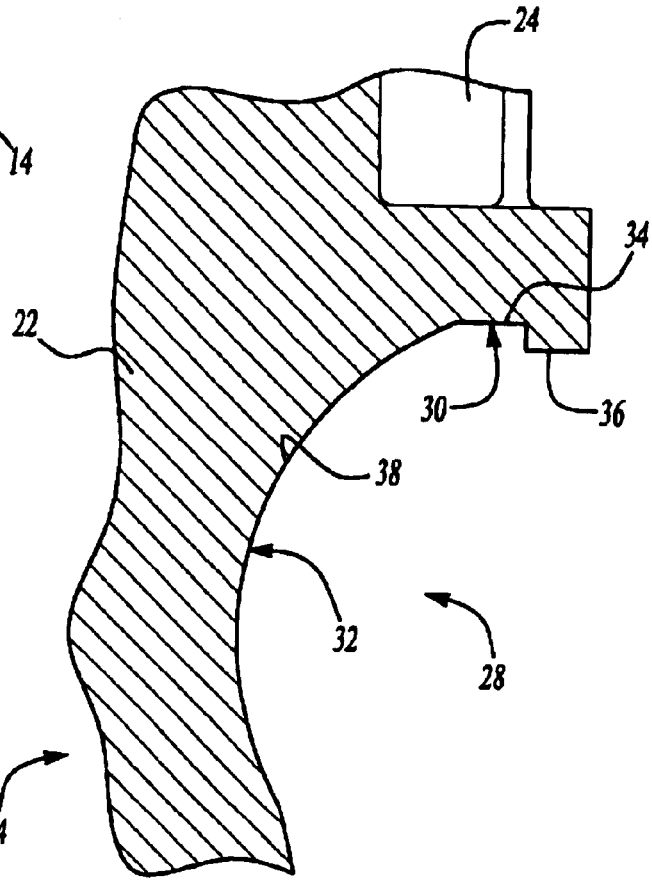
FIG. 3 is an enlarged portion of the integrally bladed turbine disk illustrated in FIG. 2.

In FIGS. 2 and 3 a portion of the integrally bladed turbine disk 14 is shown in cross-sectional view. The integrally bladed turbine disk 14 is symmetrical about a longitudinal axis 20 and includes a unitarily formed rotor portion 22 having a plurality of radially extending blades 24 and an axial face 26. In the particular embodiment illustrated, a damper cavity 28 having a first cavity portion 30 and a second cavity portion 32 is formed into the axial face 26. The first cavity portion 30 is formed into the axial face 26 in a direction perpendicular to the longitudinal axis 20. The first cavity portion 30 includes an annular face 34 and a radial lip portion 36. The second cavity portion 32 includes an arcuate inner surface 38 which intersects the annular face 34.

Figure 4:
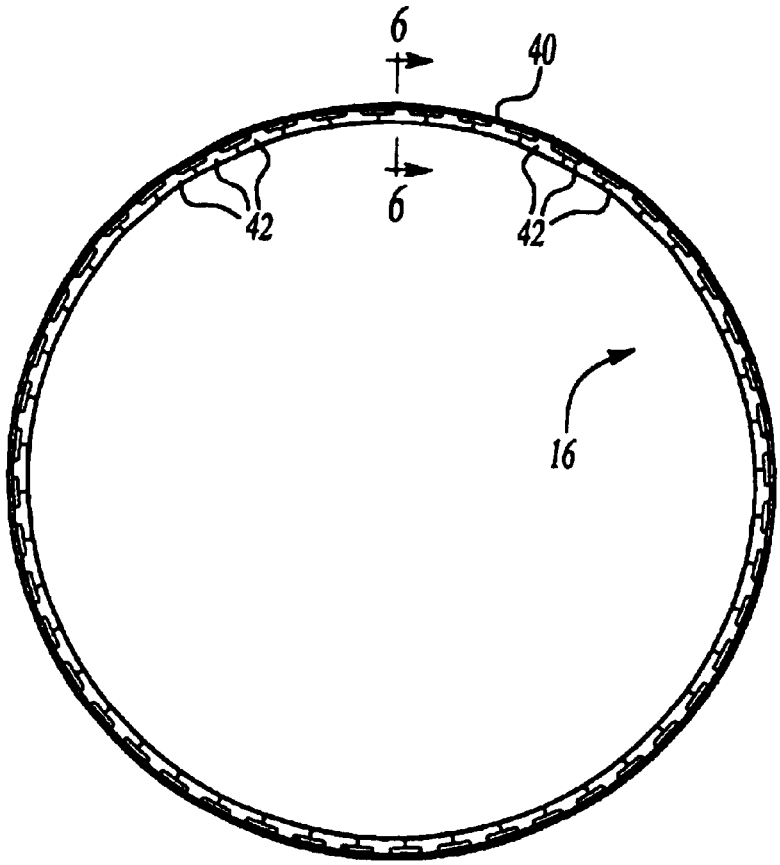
FIG. 4 is a front elevational view of a portion of the integrally bladed turbine disk assembly of FIG. 1 illustrating the damper.
Figure 5:
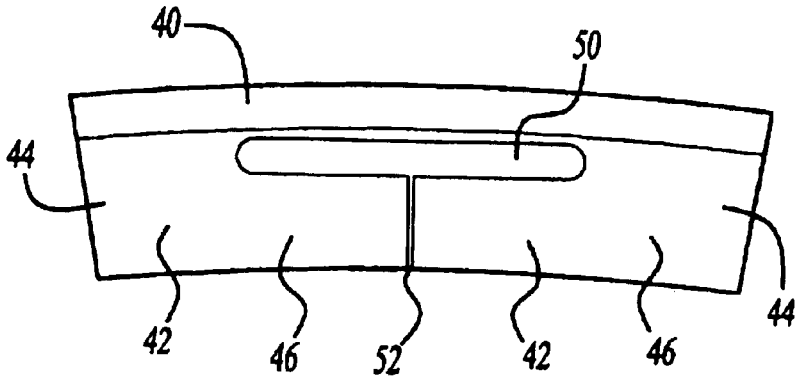
FIG. 5 is an enlarged portion of the damper illustrated in FIG. 4.
Figure 6:
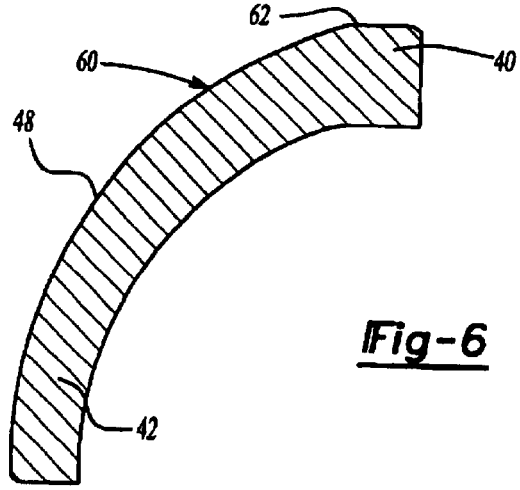
FIG. 6 is a cross-sectional view of the damper taken along the line 6—6 of FIG. 4.

The damper 16 is shown in FIGS. 4 through 6 to include an annular member 40 and a plurality of T-shaped fingers 42 that are coupled to and spaced circumferentially around the annular member 40. In the particular embodiment illustrated, the annular member 40 is a continuous hoop that is sized to engage the annular face 34 of the first cavity portion 30. Each of the plurality of T-shaped fingers 42 includes a base portion 44 and a leg portion 46. The base portion 44 is coupled to the annular member 40 and extends radially inward therefrom. The leg portion 46 is coupled to a distal end of the base portion 44 and extends tangentially therefrom. The T-shaped fingers 42 include an arcuate outer surface 48 which is configured to cooperate with the arcuate inner surface 38 in the second cavity portion 32 in a manner that will be discussed in detail below.

Preferably, the annular member 40 and the plurality of T-shaped fingers 42 are integrally formed. Construction in this manner permits each of the T-shaped fingers 42 to be formed by a pair of circumferentially-spaced, tangentially-oriented slots 50 and a pair of circumferentially-spaced, radially-extending slots 52. As shown, each of the radially-extending slots 52 intersects one of the tangentially-oriented slots 50.

Figure 7:
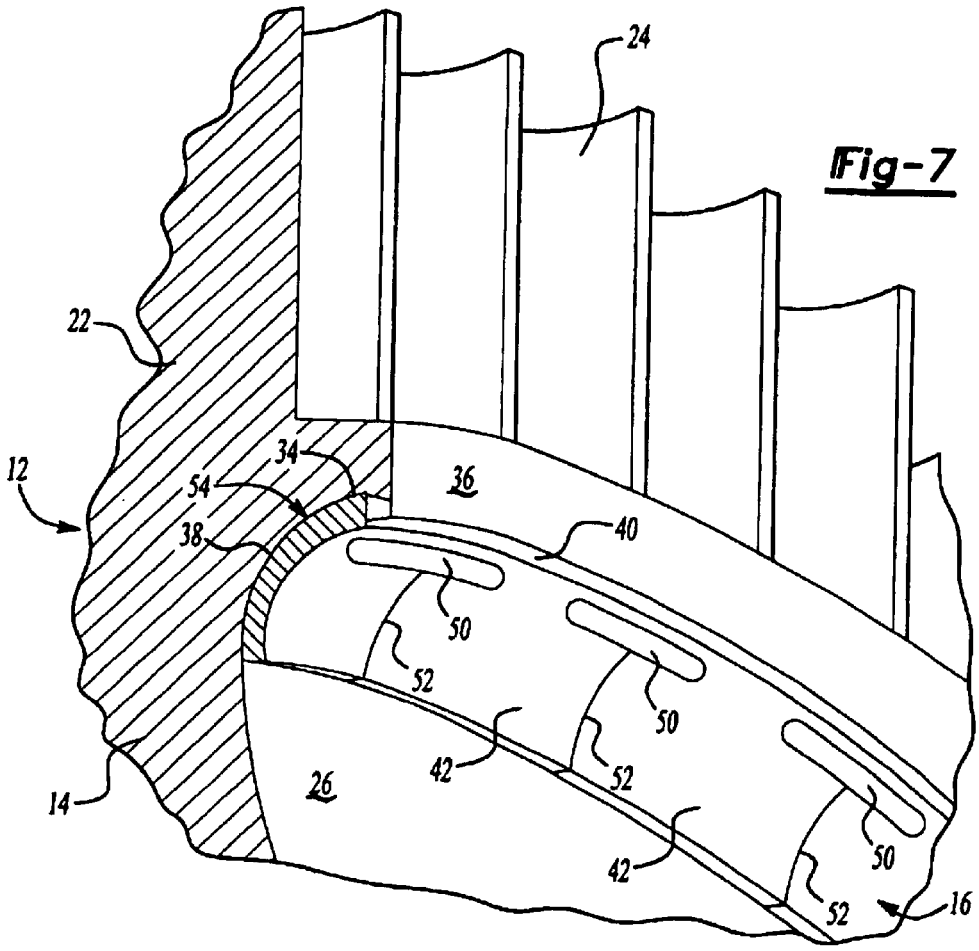
FIG. 7 is a cross-sectional view of the integrally bladed turbine disk assembly of FIG. 1.

In FIG. 7 the damper 16 is shown in operative association with the integrally bladed turbine disk 14. The damper 16 is preferably cooled in a liquid gas, such as liquid nitrogen, and shrunk-fit to the damper cavity 28 during the assembly of the integrally bladed turbine disk assembly 12. The annular member 40 provides the damper 16 with continuity to permit it to be retained in position relative to the integrally bladed turbine disk 14. The annular member 40 also provides a mechanism for preloading the plurality of T-shaped fingers 42 against the arcuate inner surface 38.

In operation, the radially-extending slots 52 and tangentially-oriented slots 50 effectively decouple the tangential motion of the annular member 40 from the T-shaped fingers 42. Due to high centrifugal forces present in the integrally bladed turbine disk assembly 12, the annular member 40 is forced against the annular face 34 with sufficient force to cause lock-up. During lock-up, relative movement between the annular member 40 and the annular face 34 is inhibited. Due to the presence of the radially-extending slots 52 and tangentially-oriented slots 50, the T-shaped fingers 42 are permitted to move tangentially at the frictional interface 54 between the integrally bladed turbine disk 14 and the damper 16 when the integrally bladed turbine disk assembly 12 vibrates in a diametral mode shape. The friction interface 54 includes an area where the annular member 40 and the T-shaped fingers 42 contact the annular face 34 and the arcuate inner surface 38, respectively. Vibration of the integrally bladed turbine disk 14 in a diametral mode causes tangential motion between the T-shaped fingers 42 and the arcuate inner surface 38. The circumferential length and thickness of the radially-extending slots 52 and tangentially-oriented slots 50 are selected to optimize the damping, centrifugal force, and relative tangential motion for a particular application.

Another unique feature of the damper 16 is the configuration of its contact surface 60 (shown in FIG. 6). The contact surface 60 includes the arcuate outer surface 48 of the T-shaped fingers 42 and the annular outer surface 62 of the annular member 40. The contact surface 60 is configured in a manner wherein the annular member 40 provides a first contact force and the T-shaped fingers 42 provide a second contact force. The first contact force provided by the annular member 40 is applied to the integrally bladed turbine disk 14 in a radial direction through the annular outer surface 62. The arcuate outer surface 48 causes the second contact force applied by the T-shaped fingers 42 to vary constantly from a radial direction to an axial orientation (i.e., against a radially extending portion of the axial face 26 of the integrally bladed turbine disk 14). Consequently, the majority of the damper centrifugal load is transferred to the integrally bladed turbine disk 14 through the annular member 40 while the T-shaped fingers 42 provide a much smaller contact force. Configuration in this manner prevents lock-up between the T-shaped fingers 42 and the integrally bladed turbine disk 14.

The frictional characteristics of the contact surface 60 may be controlled through the finishing of contact surface 60 to a desired surface finish or through the application of a coating, such as silver plating or molydisulfide. Silver plating is highly desirable as it is resistant to fretting which can result from micro-motion between the damper 16 and the integrally bladed turbine disk 14.

Figure 8:
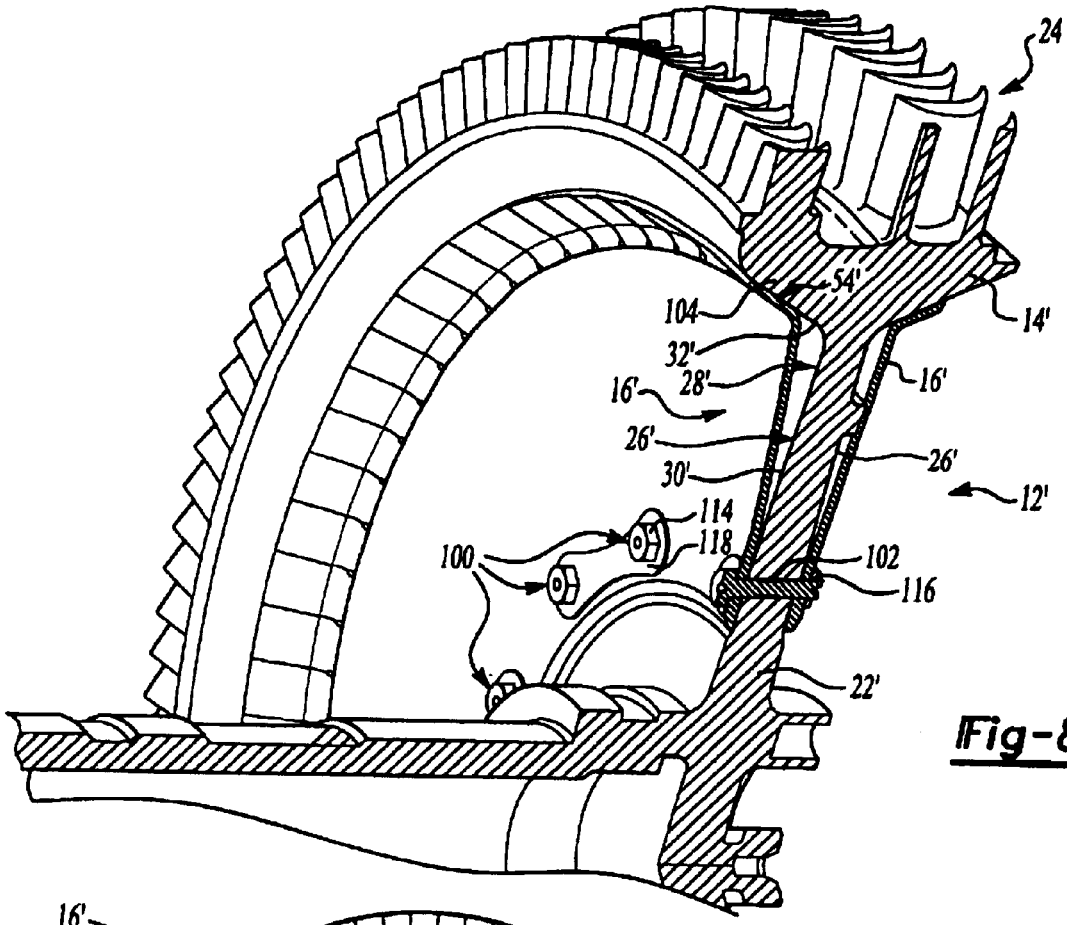
FIG. 8 is a cross-sectional view of an integrally bladed turbine disk assembly constructed in accordance with an alternate embodiment of the present invention.
Figure 10:
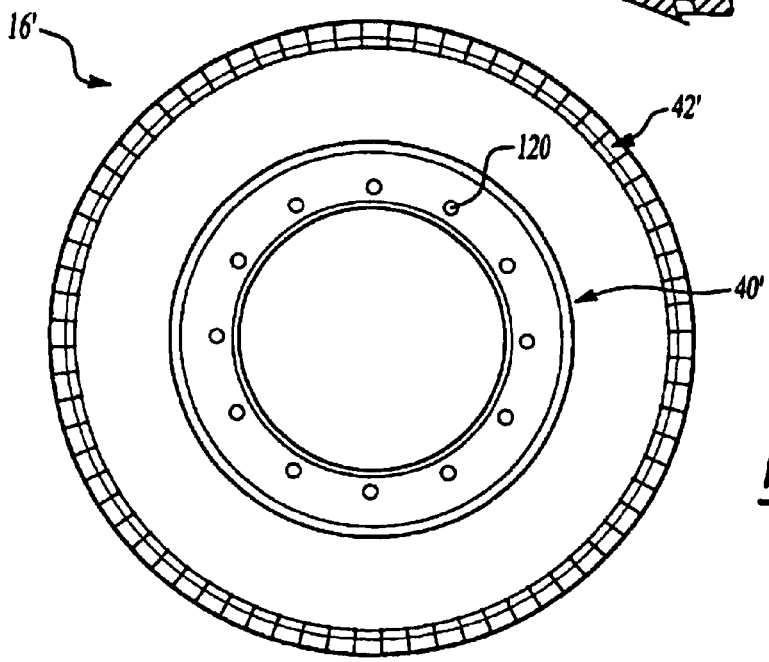
FIG. 10 is a front elevational view of a portion of the integrally bladed turbine disk assembly of FIG. 8 illustrating the damper in greater detail.
Figure 9:
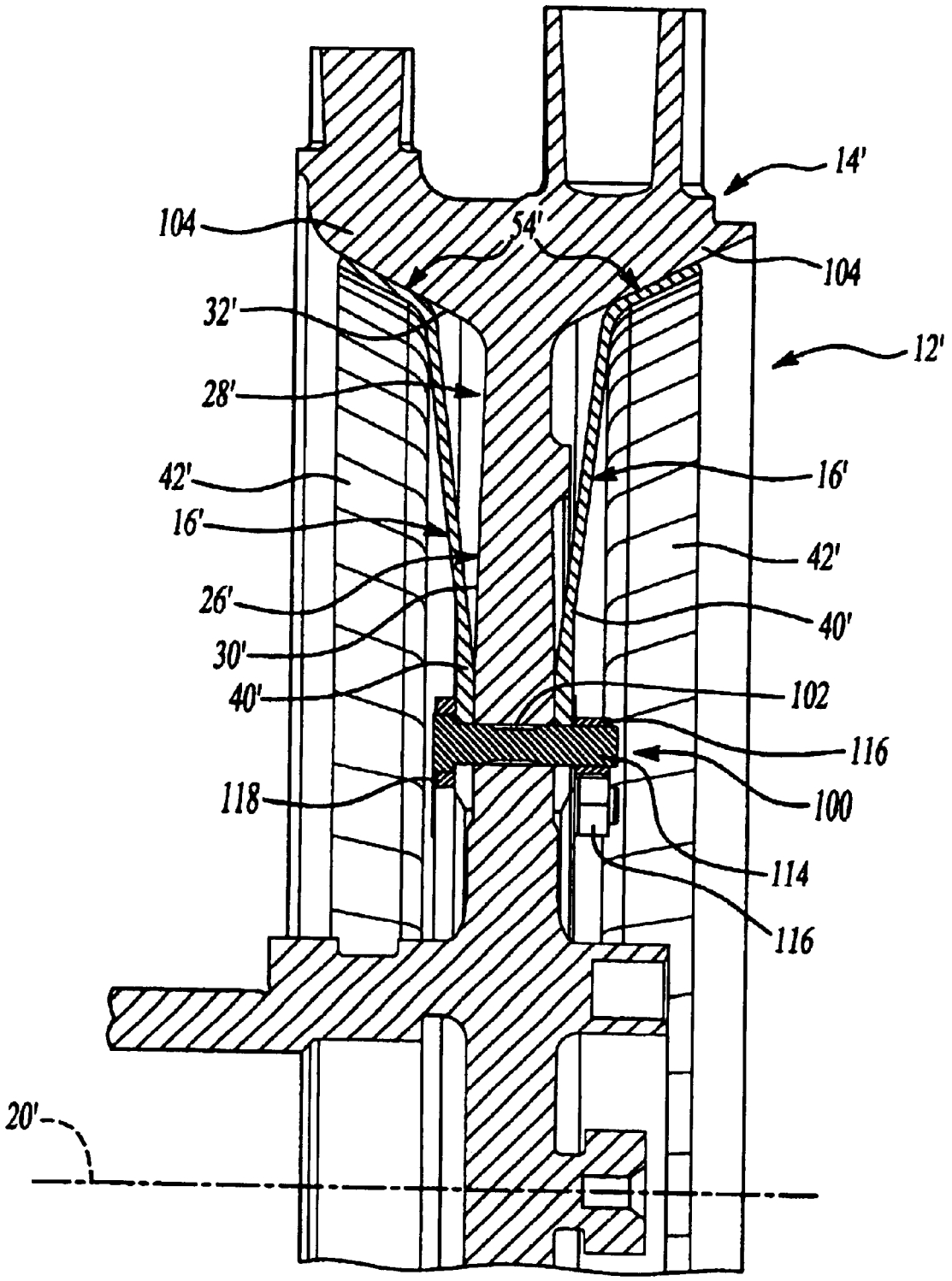
FIG. 9 is a longitudinal cross-sectional view of the integrally bladed turbine disk assembly of FIG. 8.
Figure 11:
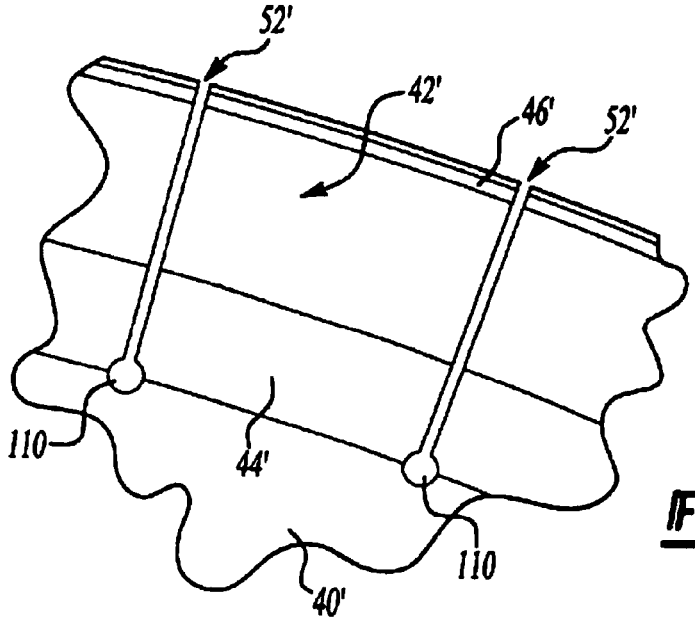
FIG. 11 is an enlarged view of a portion of the damper illustrated in FIG. 10.
Figure 12:
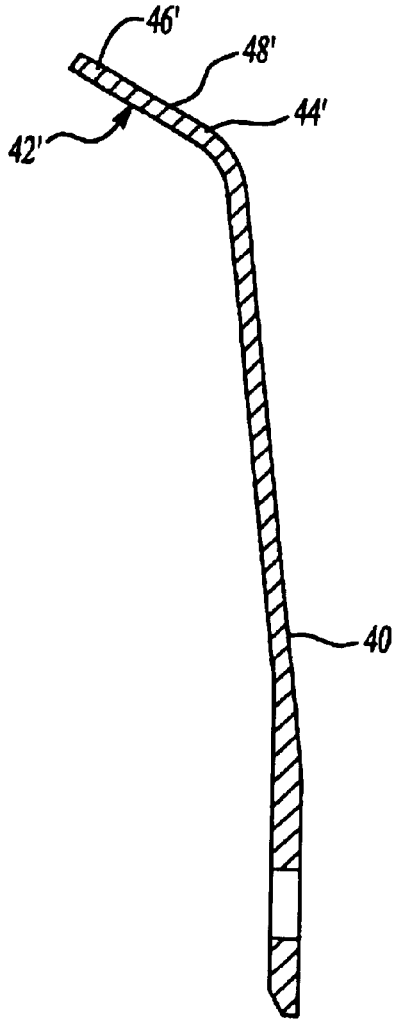
FIG. 12 is a cross-sectional view of a portion of the damper taken along the line 12—12 of FIG. 10.

While the integrally bladed turbine disk assembly 12 has been described thus far as including a damper 16 with T-shaped fingers 42 which is shrunk-fit to a damper cavity 28 during the assembly of the integrally bladed turbine disk assembly 12, those skilled in the art will appreciate that the invention, in its broader aspects, may be constructed somewhat differently. For example, the damper 16' may be coupled to a face of the integrally bladed turbine disk 14' as illustrated in FIGS. 8 and 9. In this arrangement, integrally bladed turbine disk assembly 12' is shown to include a pair of dampers 16' which are coupled to the integrally bladed turbine disk 14' via a plurality of fasteners 100. Integrally bladed turbine disk 14' is symmetrical about its longitudinal axis 20' and includes a unitarily formed rotor portion 22' having a plurality of radially extending blades 24 and an pair of axial faces 26'.

In the particular embodiment illustrated, a damper cavity 28' having a first cavity portion 30' and a second cavity portion 32' is formed into each of the axial faces 26'. The first cavity portion 30' is formed into the axial face 26' in a direction parallel the longitudinal axis 20'. The first cavity portion 30' includes an plurality of fastener apertures 102. The second cavity portion 32' is illustrated to include a circumferentially extending wall member 104 which is skewed to the first cavity portion 30', thereby providing the second cavity portion 32' with a shape corresponding to a truncated inverse cone. Those skilled in the art will understand that the shape of second cavity portion 32' may be tailored in a desired manner to achieve specific design goals and as such, the second cavity portion 32' may alternatively be arcuately shaped.

In FIGS. 9 through 12, the damper 16' is shown to include an annular member 40' and a plurality of fingers 42' that are coupled to and spaced circumferentially around the annular member 40'. In the particular embodiment illustrated, the annular member 40' is a flange that abuts the first cavity portion 30'. Each of the plurality of fingers 42' includes a base portion 44' and an end portion 46'. The base portion 44' is coupled to the annular member 40' and extends radially inward therefrom. The end portion 46' is coupled to a distal end of the base portion 44' and extends therefrom to contact the second cavity portion 32'. The fingers 42' include an outer surface 48' which is configured to cooperate with the wall member 104 of the second cavity portion 32' in a manner that will be discussed in detail below. Preferably, the annular member 40' and the plurality of fingers 42' are integrally formed. Construction in this manner permits each of the fingers 42' to be formed by a pair of circumferentially spaced, radially extending slots 52'. As shown, each of the radially extending slots 52' terminates at a slot aperture 110 which is employed to reduce the concentration of stress at the intersections between annular member 40' and each of the plurality of fingers 42' when damper 16' is in operation.

In FIGS. 8 and 9, the plurality of fasteners 100 are illustrated to include a plurality of externally threaded fasteners 114, a plurality of internally threaded nuts 116 and a plurality of dog-bone washers 118. Each of the dog-bone washers 118 is positioned over a pair of circumferentially adjacent fastener apertures 120 and 102 formed into the annular member 40' and the first cavity portion 30' of the integrally bladed turbine disk 14', respectively. Externally threaded fasteners 114 are placed through fastener apertures 120 and 102 and internally threaded nuts 116 are threadably engaged to the externally threaded fasteners 114 such that a clamping force is generated by fasteners 100 to retain annular member 40' such that annular member 40' will not rotate about the longitudinal axis 20'.

In operation, the radially extending slots 52' effectively decouple the tangential motion of the annular member 40' from the fingers 42'. The radially extending slots 52' permit the fingers 42' to move tangentially at a frictional interface 54' between the integrally bladed turbine disk 14' and the damper 16' when the integrally bladed turbine disk assembly 12' vibrates in a diametral mode shape. The friction interface 54' includes an area where the fingers 42' contact the wall member 104 of the second cavity portion 32'. Vibration of the integrally bladed turbine disk 14' in a diametral mode is transmitted to and absorbed by damper 16'. In this regard, the vibrations cause tangential motion in the plurality of fingers 42' relative to wall member 104 so that the energy of the vibrations is absorbed in the friction interface 54' by frictional contact between the plurality of fingers 42' and the wall member 104.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A damper for damping vibration in an integrally bladed turbine disk, the damper comprising:

an annular member *having an axial center* adapted for being coupled to the integrally bladed turbine disk; [and]

a plurality of fingers spaced circumferentially around the annular member, each of the fingers having a base portion which is coupled to the annular member and extending radially therefrom;

wherein each of the fingers is tangentially movable relative to the annular member when the turbine disk vibrates in a diametral mode shape such that the plurality of fingers contacts a surface of the turbine disk to absorb vibrations[.]; *and*

*wherein the base portion of each of the fingers is defined by a plurality of circumferentially spaced, elongated slots extending orthogonal to a radial line bisecting the axial center.*

2. The damper of claim 1, wherein each of the plurality of fingers includes a frictional surface adapted to contact a face of the integrally bladed turbine disk.

3. The damper of claim 2, wherein the frictional surface of each of the plurality of fingers is arcuate in shape.

4. The damper of claim 2, wherein the frictional surface is formed from a material that is resistant to fretting.

5. The damper of claim 1, wherein the annular member and the plurality of fingers are integrally formed.

[6. The damper of claim 5, wherein each base portion is formed by a pair of circumferentially spaced, radially extending slots.]

7. The damper of claim [6] *1*, wherein each of the plurality of fingers is further defined by a pair of circumferentially-spaced, radially-extending slots, each of the circumferentially-spaced, radially [oriented] *extending* slots intersecting one of the circumferentially-spaced, [radially extending] *elongated* slots, the circumferentially-spaced, radially [oriented] *extending* slots cooperating with the circumferentially-spaced, [radially extending] *elongated* slots to provide the plurality of fingers with a generally T-shape.

[8. The damper of claim 6, wherein each of the circumferentially-spaced, radially extending slots terminates at a slot aperture for reducing a concentration of stress at an intersection between the annular member and the plurality of fingers.]

9. The damper of claim 5, wherein the annular member is a continuous hoop.

10. An integrally bladed turbine disk assembly comprising:

an integrally bladed turbine disk; [and]

a damper for damping vibration in the integrally bladed turbine disk, the damper including an annular member and a plurality of fingers, the annular member coupled to an axial face of the integrally bladed turbine disk, the plurality of fingers coupled to and circumferentially spaced around the annular member, each of the fingers having a base portion coupled to the annular member and extending radially outwardly therefrom, each of the fingers including a contact surface for contacting the axial face of the integrally bladed turbine disk;

wherein the annular member and the plurality of fingers are integrally formed and each of the fingers is adapted to move tangentially relative to the annular member such that contact between the contact surface and the axial face of the integrally bladed turbine disk reduces vibrations in the integrally bladed turbine disk when the integrally bladed turbine disk vibrates in a diametral mode shape[.]*; and wherein the base portion of each of the fingers is defined by a plurality of circumferentially spaced, generally circular openings each communicating with a radially extending slot.*

[11. The integrally bladed turbine disk assembly of claim 10, wherein each base portion is formed by a pair of circumferentially spaced, radially extending slots.]

[12. The integrally bladed turbine disk assembly of claim 11, wherein each of the plurality of fingers is further defined by a pair of circumferentially-spaced, radially-extending slots, each of the circumferentially-spaced, radially oriented slots intersecting one of the circumferentially-spaced, radially extending slots, the circumferentially-spaced, radially oriented slots cooperating with the circumferentially-spaced, radially extending slots to provide the plurality of fingers with a generally T-shape.]

13. The integrally bladed turbine disk assembly of claim 10, wherein the annular member is a continuous hoop.

14. The integrally bladed turbine disk assembly of claim 10, wherein the annular member is shrunk-fit into a cavity formed into the axial face.

15. The integrally bladed turbine disk assembly of claim 10, wherein a plurality of fasteners are employed to fixedly couple the annular member to the axial face.

16. The integrally bladed turbine disk assembly of claim 15, wherein contact between the plurality of fingers and the axial face of the integrally bladed turbine disk generates a contact force which is applied to the integrally bladed turbine disk in a direction that is normal to the contact surface.

17. The integrally bladed turbine disk assembly of claim 16, wherein the contact force is received by an arcuate pocket formed into the axial face of the integrally bladed turbine disk.

18. The integrally bladed turbine disk assembly of claim 17, wherein the annular member and the plurality of fingers are coated with a material that is resistant to fretting.

19. The integrally bladed turbine disk assembly of claim 10, wherein the contact surface is arcuately shaped.

20. The integrally bladed turbine disk assembly of claim 10, wherein the axial face of the integrally bladed turbine disk includes a circumferentially extending wall member having a shape corresponding to a truncated inverse cone, the contact surface of the plurality of fingers contacting the circumferentially extending wall member to reduce vibrations in the integrally bladed turbine disk when the integrally bladed turbine disk vibrates in a diametral mode shape.

* * * * *